US012706289B2

(12) United States Patent
Tashiro et al.

(10) Patent No.: US 12,706,289 B2
(45) Date of Patent: Aug. 11, 2026

(54) SAMPLE SUPPORT

(71) Applicant: HAMAMATSU PHOTONICS K.K., Hamamatsu (JP)

(72) Inventors: Akira Tashiro, Hamamatsu (JP); Takayuki Ohmura, Hamamatsu (JP); Masahiro Kotani, Hamamatsu (JP); Takamasa Ikeda, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 609 days.

(21) Appl. No.: 18/015,804

(22) PCT Filed: May 10, 2021

(86) PCT No.: PCT/JP2021/017722
§ 371 (c)(1),
(2) Date: Jan. 12, 2023

(87) PCT Pub. No.: WO2022/038843
PCT Pub. Date: Feb. 24, 2022

(65) Prior Publication Data

US 2023/0253196 A1 Aug. 10, 2023

(30) Foreign Application Priority Data

Aug. 19, 2020 (JP) ................................ 2020-138592

(51) Int. Cl.
*H01J 49/04* (2006.01)

(52) U.S. Cl.
CPC ................................ *H01J 49/0418* (2013.01)

(58) Field of Classification Search
CPC .................................................. H01J 49/0418
See application file for complete search history.

(56) References Cited

U.S. PATENT DOCUMENTS

| | | | |
|---|---|---|---|
| 8,598,511 | B1 | 12/2013 | Schlaf et al. |
| 2006/0180755 | A1 | 8/2006 | Chang et al. |
| 2010/0065735 | A1 | 3/2010 | Murakami et al. |

(Continued)

FOREIGN PATENT DOCUMENTS

| | | | |
|---|---|---|---|
| CN | 106796198 | A | 5/2017 |
| JP | 2008-070187 | A | 3/2008 |

(Continued)

OTHER PUBLICATIONS

Yonezawa, T. et al., "Detailed Investigation on the Possibility of Nanoparticles of Various Metal Elements for Surface-Assisted Laser Desorption/Ionization Mass Spectrometry," https://doi.org/10.2116/analsci.25.339, Analytical Sciences, 2009, vol. 25, No. 3, pp. 339-346.

(Continued)

*Primary Examiner* — Georgia Y Epps
*Assistant Examiner* — Hanway Chang
(74) *Attorney, Agent, or Firm* — FAEGRE DRINKER BIDDLE & REATH LLP

(57) ABSTRACT

A sample support used for sample component ionization includes: a substrate having a first surface and a plurality of holes opening to the first surface; and a conductive layer provided on the first surface so as not to block the hole, in which the conductive layer is configured by a plurality of nanoparticles and has a thickness of 30 nm or more.

10 Claims, 10 Drawing Sheets

(56) References Cited

U.S. PATENT DOCUMENTS

| | | | | |
|---|---|---|---|---|
| 2010/0294926 | A1 | 11/2010 | Murakami | |
| 2012/0104243 | A1 | 5/2012 | Verbeck, IV et al. | |
| 2015/0021470 | A1 | 1/2015 | Arakawa et al. | |
| 2017/0358436 | A1 * | 12/2017 | Naito .................. | H01J 49/0418 |

FOREIGN PATENT DOCUMENTS

| | | | |
|---|---|---|---|
| JP | 2010-071727 | A | 4/2010 |
| JP | 4885142 | B2 | 2/2012 |
| JP | 6093492 | B1 | 3/2017 |
| WO | WO-2007/046162 | A1 | 4/2007 |
| WO | WO-2013/122225 | A1 | 8/2013 |
| WO | WO-2017/038710 | A1 | 3/2017 |
| WO | WO-2019/155967 | A1 | 8/2019 |

OTHER PUBLICATIONS

International Preliminary Report on Patentability mailed Mar. 2, 2023 for PCT/JP2021/017722.

Wang Hui et al, "Nanosphere Arrays with Controlled Sub-10-nm Gaps as Surface-Enhanced Raman Spectroscopy Substrates", Journal of the American Chemical Society, vol. 127, No. 43, Oct. 8, 2005, p. 14992-p. 14993, XP093147508.

* cited by examiner

SAMPLE SUPPORT

BACKGROUND ART

In the related art, sample supports for sample component ionization in mass spectrometry of samples are known (see, for example, Patent Literature 1). Such a sample support includes a substrate having a first surface, a second surface on the side opposite to the first surface, and a plurality of through holes opening to the first and second surfaces.

CITATION LIST

Patent Literature

Patent Literature 1: Japanese Patent No. 6093492

SUMMARY OF INVENTION

Technical Problem

In mass spectrometry as described above, an ionized sample (sample ions) is detected and mass spectrometry of the sample is performed based on the detection result. Sensitivity (signal intensity) improvement is desired in such mass spectrometry.

In this regard, an object of one aspect of the present disclosure is to provide a sample support enabling high-sensitivity mass spectrometry.

Solution to Problem

A sample support according to one aspect of the present disclosure is used for sample component ionization. The sample support includes: a substrate having a first surface and a plurality of holes opening to the first surface; and a conductive layer provided on the first surface so as not to block the hole, in which the conductive layer is configured by a plurality of nanoparticles and has a thickness of nm or more.

This sample support includes the substrate having the first surface and the plurality of holes opening to the first surface. As a result, when components of a sample are introduced into the plurality of holes, the components remain on the first surface side. Further, when the first surface of the substrate is irradiated with an energy ray such as laser light while a voltage is applied to the conductive layer, the energy is transmitted to the components on the first surface side. Sample ions are generated by this energy ionizing the components. Here, the conductive layer is configured by the plurality of nanoparticles and has a thickness of 30 nm or more. As a result, by providing the surface of the conductive layer with nanoparticle properties, the surface of the conductive layer can be made suitable for ionizing the components of the sample. Accordingly, with this sample support, the signal intensity of the sample ions can be improved and high-sensitivity mass spectrometry can be performed.

The nanoparticles may be deposited on the first surface and a part of an inner wall surface of the hole on the first surface side. In this case, the components of the sample introduced into the plurality of holes easily come into contact with the nanoparticles, and thus the components of the sample are ionized more easily.

An average particle size of the nanoparticles may be 100 nm or less. In this case, the nanoparticle properties of the conductive layer can be appropriately ensured.

The conductive layer may have a thickness of 300 nm or less. If the thickness of the conductive layer is relatively large, it may be difficult to ensure the nanoparticle properties of the conductive layer. By the thickness of the conductive layer being 300 nm or less, the nanoparticle properties of the conductive layer can be ensured more appropriately.

A width of each of the plurality of holes may be 50 nm to 400 nm. In this case, the components of the sample introduced into the plurality of holes can be appropriately retained on the first surface side of the substrate.

The plurality of holes may regularly extend along a thickness direction of the substrate. In this case, the components of the sample introduced into the plurality of holes can be retained on the first surface of the substrate for each hole. As a result, the components of the sample can be appropriately ionized.

The substrate may have a second surface on a side opposite to the first surface, and each of the plurality of holes may penetrate the substrate from the first surface to the second surface. In this case, by disposing the sample support on the sample such that the second surface of the sample support faces the sample, the components of the sample can be moved from the second surface side of the substrate toward the first surface side via the plurality of holes using capillary action. As a result, imaging mass spectrometry for imaging the two-dimensional distribution of the molecules configuring the sample can be performed.

A ratio of the thickness of the conductive layer to a pitch between the holes may be 0.5 to 1. In this case, the nanoparticle properties of the conductive layer can be appropriately ensured by setting the thickness of the conductive layer based on the pitch between the holes.

A material of the conductive layer may be platinum or gold. In this case, the conductive layer suitable for ensuring nanoparticle properties can be easily obtained.

Advantageous Effects of Invention

According to one aspect of the present disclosure, a sample support enabling high-sensitivity mass spectrometry can be provided.

DESCRIPTION OF EMBODIMENTS

Figure 1:
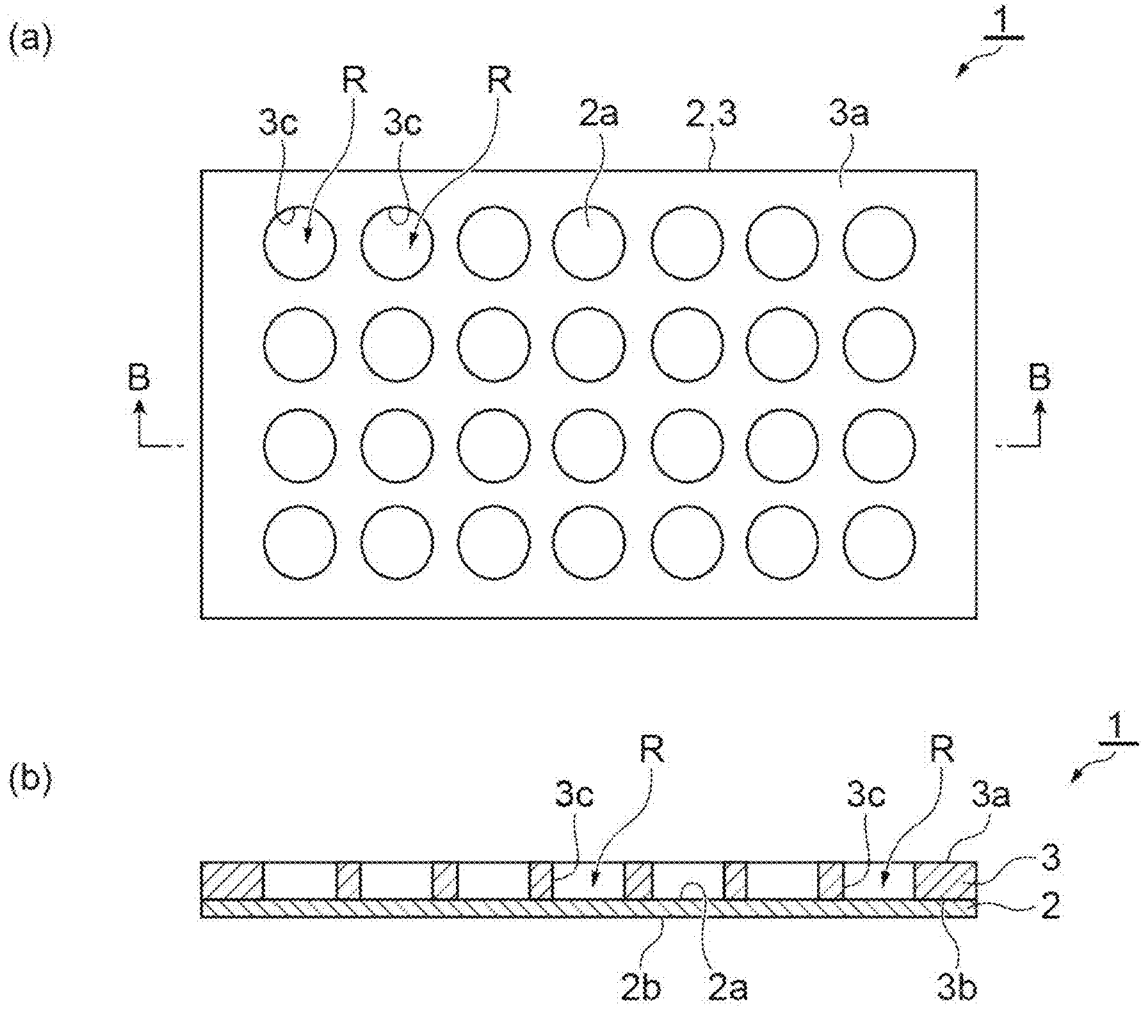
FIG. 1 is a plan view and a cross-sectional view of a sample support according to one embodiment.

Hereinafter, an embodiment of the present disclosure will be described in detail with reference to the drawings. It should be noted that in each of the drawings, the same or corresponding parts are denoted by the same reference numerals with redundant description omitted.

Figure 2:
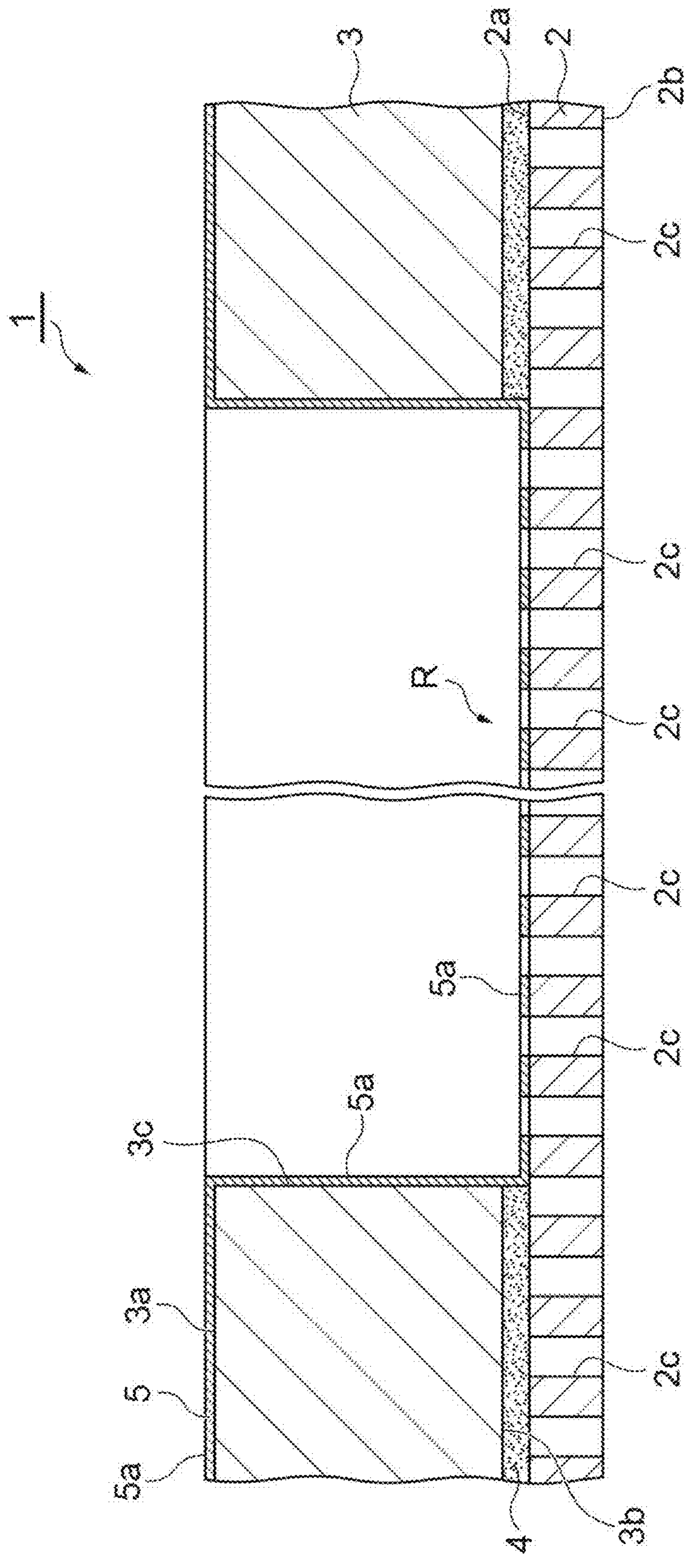
FIG. 2 is an enlarged cross-sectional view of the sample support illustrated in FIG. 1.

[Configuration of Sample Support] As illustrated in (a) and (b) in FIG. 1, and FIG. 2, a sample support 1 used for sample component ionization includes a substrate 2, a frame 3, and a conductive layer 5. The substrate 2 has, for example, a rectangular plate shape. The length of one side of the substrate 2 is, for example, approximately several centimeters. The thickness of the substrate 2 is, for example, 1 μm to 50 μm.

The substrate 2 has a first surface 2*a*, a second surface 2*b*, and a plurality of holes 2*c*. The second surface 2*b* is on the side that is opposite to the first surface 2*a*. The plurality of holes 2*c* regularly extend along the thickness direction of the substrate 2 (direction perpendicular to the first surface 2*a* and the second surface 2*b*). Specifically, the respective axes of the plurality of holes 2*c* extend along the thickness direction and are substantially parallel to each other. The respective axes of the plurality of holes 2*c* do not intersect each other. In the present embodiment, the plurality of holes 2*c* are uniformly formed (uniformly distributed) in the substrate 2. Each of the plurality of holes 2*c* penetrates the substrate 2 from the first surface 2*a* to the second surface 2*b*. In other words, each of the plurality of holes 2*c* is open to each of the first surface 2*a* and the second surface 2*b*.

The hole 2*c* is, for example, substantially circular when viewed in the thickness direction of the substrate 2. The width of the hole 2*c* is 50 nm to 400 nm. In the present embodiment, the width of the hole 2*c* is approximately 200 nm. The width of the hole 2*c* means the diameter of the hole 2*c* when the shape of the hole 2*c* viewed in the thickness direction is substantially circular. The width of the hole 2*c* means the diameter of a virtual maximum cylinder that fits in the hole 2*c* (effective diameter) when the shape is not substantially circular. In the present embodiment, the pitch between the holes 2*c* is approximately 260 nm. When the shape of the hole 2*c* viewed in the thickness direction is substantially circular, the pitch between the holes 2*c* means the distance between the centers of the circles. When the shape is not substantially circular, the pitch between the holes 2*c* means the distance between the central axes of virtual maximum cylinders that fit in the holes 2*c*.

Figure 3:
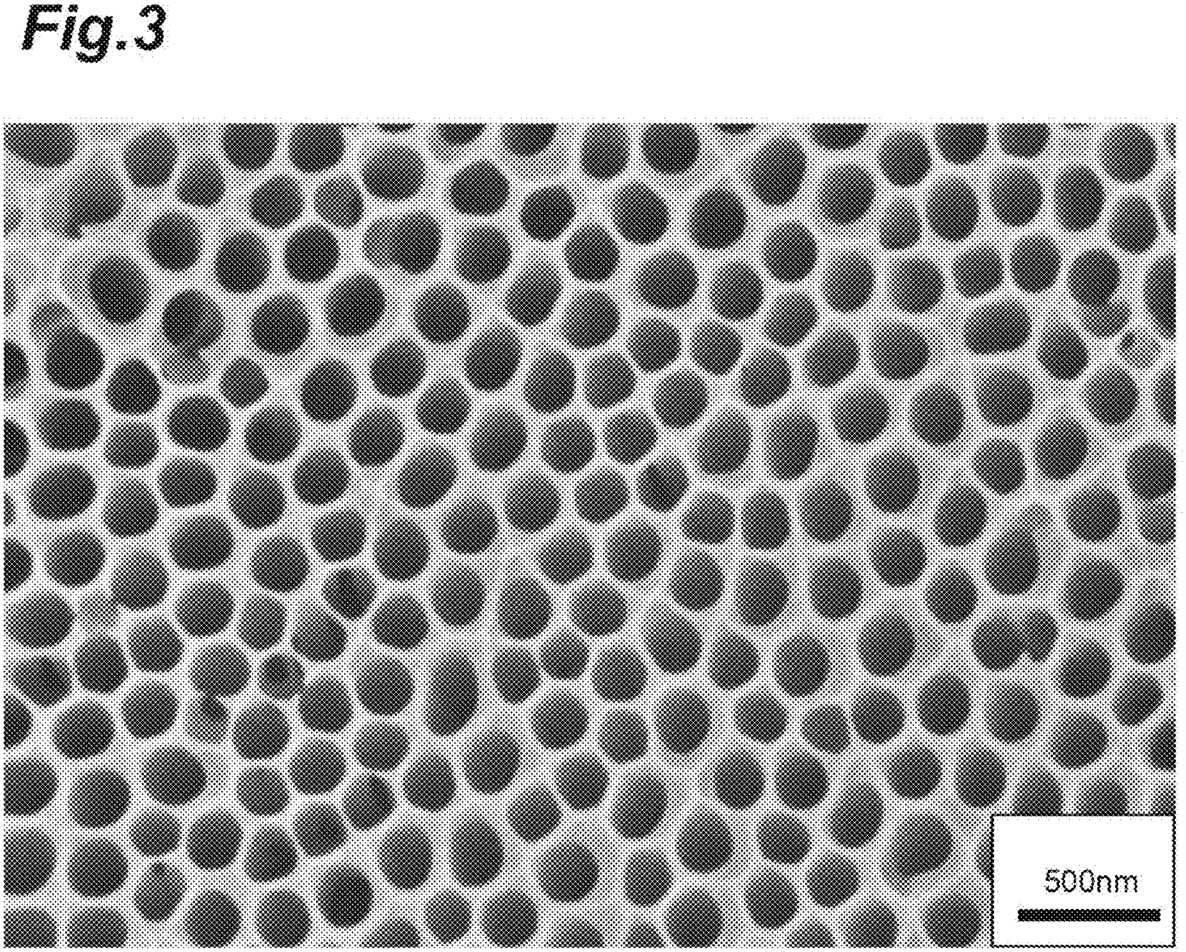
FIG. 3 is a diagram illustrating a magnified image of a substrate viewed in the thickness direction of the substrate illustrated in FIG. 1.

The width of the hole 2*c* is a value acquired as follows. First, an image of each of the first surface 2*a* and the second surface 2*b* of the substrate 2 is acquired. FIG. 3 illustrates an example of a scanning electron microscope (SEM) image of a part of the first surface 2*a* of the substrate 2. The black parts in the SEM image are the holes 2*c*, and the white parts in the SEM image are partition wall portions between the holes 2*c*. Subsequently, by performing, for example, binarization processing on the acquired image of the first surface 2*a*, a plurality of pixel groups corresponding to a plurality of first openings (openings of the holes 2*c* on the first surface 2*a* side) in a measurement region R are extracted, and the diameter of a circle having the average area of the first openings is acquired based on the size per pixel. Likewise, by performing, for example, binarization processing on the acquired image of the second surface 2*b*, a plurality of pixel groups corresponding to a plurality of second openings (openings of the holes 2*c* on the second surface 2*b* side) in the measurement region R are extracted, and the diameter of a circle having the average area of the second openings is acquired based on the size per pixel. Then, the average value of the diameter of the circle acquired with regard to the first surface 2*a* and the diameter of the circle acquired with regard to the second surface 2*b* is acquired as the width of the hole 2*c*.

The pitch between the holes 2*c* is a value acquired as follows. First, the plurality of pixel groups corresponding to the plurality of first openings in the measurement region R are extracted as described above, and the average distance between the center positions of the first openings adjacent to each other is acquired. Likewise, the plurality of pixel groups corresponding to the plurality of second openings in the measurement region R are extracted, and the average distance between the center positions of the second openings adjacent to each other is acquired. Then, the average value of the average distance acquired with regard to the first surface 2*a* and the average distance acquired with regard to the second surface 2*b* is acquired as the pitch between the holes 2*c*.

As illustrated in FIG. 3, the plurality of holes 2*c* substantially constant in width are uniformly formed in the substrate 2. It is preferable that the opening ratio of the holes 2*c* in the measurement region R (ratio of all the holes 2*c* to the measurement region R when viewed in the thickness direction of the substrate 2) is practically 10 to 80%, particularly 20 to 40%. The plurality of holes 2*c* may be mutually irregular in size or may be partially interconnected.

The substrate 2 illustrated in FIG. 3 is an alumina porous film formed by anodizing aluminum (Al). Specifically, the substrate 2 can be obtained by anodizing an Al substrate and peeling the oxidized surface part off the Al substrate. It should be noted that the substrate 2 may be formed by anodizing a non-Al valve metal such as tantalum (Ta), niobium (Nb), titanium (Ti), hafnium (Hf), zirconium (Zr), zinc (Zn), tungsten (W), bismuth (Bi), and antimony (Sb) or may be formed by anodizing silicon (Si).

As illustrated in FIGS. 1 and 2, the frame 3 has substantially the same outer shape as the substrate 2 when viewed in the thickness direction of the substrate 2. The frame 3 has a third surface 3*a*, a fourth surface 3*b*, and a plurality of openings 3*c*. The fourth surface 3*b* is on the side that is opposite to the third surface 3*a* and is on the substrate 2 side. The opening 3*c* is open to each of the third surface 3*a* and the fourth surface 3*b*. The plurality of openings 3*c* are disposed in a matrix when viewed in the thickness direction of the frame 3. The plurality of openings 3*c* respectively define a plurality of the measurement regions R. In other words, the plurality of measurement regions R are formed on the substrate 2. A sample is disposed in each measurement region R. The frame 3 is attached to the substrate 2. In the present embodiment, the first surface 2*a* of the substrate 2 and the region of the fourth surface 3*b* of the frame 3 other than the plurality of openings 3*c* are fixed to each other by an adhesive layer 4.

The material of the adhesive layer 4 is, for example, an adhesive material that emits little gas (such as low-melting point glass and vacuum adhesive). In the sample support 1, the parts of the substrate 2 corresponding to the openings 3*c* of the frame 3 function as the measurement regions R for sample component movement from the second surface 2*b* side to the first surface 2*a* side via the plurality of holes 2*c*.

The frame 3 facilitates handling of the sample support 1 and suppresses deformation of the substrate 2 attributable to, for example, a change in temperature.

As illustrated in FIG. 2, the conductive layer 5 is provided on the first surface 2*a* side of the substrate 2. The conductive layer 5 is provided directly on the first surface 2*a* (that is, without interposing another film or the like). Specifically, the conductive layer 5 is continuously (integrally) formed on the regions of the first surface 2*a* of the substrate 2 corresponding to the plurality of openings 3*c* of the frame 3 (that is, regions corresponding to the plurality of measurement regions R), the inner surfaces of the plurality of openings 3*c*, and the third surface 3*a* of the frame 3. In the measurement region R, the conductive layer 5 covers the parts of the first surface 2*a* of the substrate where the holes 2*c* are not formed. In other words, in the measurement region R, each hole 2*c* is exposed to the opening 3*c*. The conductive layer 5 is provided on the first surface 2*a* so as not to block each hole 2*c*. It should be noted that the conductive layer 5 may be indirectly provided on the first surface 2*a* (that is, via another film or the like).

The conductive layer 5 is formed of a conductive material. However, for the reasons described below, it is preferable to use a highly conductive metal of low sample affinity (reactivity) as the material of the conductive layer 5.

For example, if the conductive layer 5 is formed of a metal such as copper (Cu) that has a high affinity with a sample such as protein, the sample is ionized with Cu atoms attached to sample molecules in the process of ionizing the sample. As a result, the ionized sample is detected as Cu-added molecules, and thus the detection result may deviate. Accordingly, it is preferable to use a low-sample affinity precious metal as the material of the conductive layer 5.

On the other hand, a constant voltage can be applied more easily and stably with a metal higher in conductivity. Accordingly, if the conductive layer 5 is formed of a highly conductive metal, it is possible to uniformly apply a voltage to the first surface 2*a* of the substrate 2 in the measurement region R. In addition, the material of the conductive layer 5 is preferably a metal capable of efficiently transmitting the energy of laser light with which the substrate 2 is irradiated to a sample via the conductive layer 5. For example, in the case of irradiation with standard laser light (such as triple harmonic Nd or YAG laser approximately 355 nm in wavelength and nitrogen laser approximately nm in wavelength) used for matrix-assisted laser desorption/ionization (MALDI) or the like, it is preferable that the material of the conductive layer 5 is, for example, Al, gold (Au), or platinum (Pt), which is highly absorbent in an ultraviolet region.

From the above viewpoint, it is preferable to use Au, Pt, or the like as the material of the conductive layer 5. In the present embodiment, the material of the conductive layer 5 is Pt. The thickness of the conductive layer 5 is 30 nm to 300 nm, particularly preferably 50 nm to 150 nm. In the present embodiment, the thickness of the conductive layer 5 is approximately 100 nm. The ratio of the thickness of the conductive layer 5 to the pitch between the holes 2*c* (that is, "thickness of the conductive layer 5/pitch between the holes 2*c*") is 0.5 to 1, particularly preferably 0.8 to 1.

The conductive layer 5 is an evaporation film, a sputter film, an atomic deposition film, or the like. In other words, the conductive layer 5 can be formed by evaporation, sputtering, atomic layer deposition (ALD), or the like. Alternatively, the conductive layer 5 may be formed by, for example, plating. In the present embodiment, the conductive layer 5 is an evaporation film and is formed by electron beam evaporation. In general, the evaporation of a conductive layer is performed on a heated substrate so that the flatness of the conductive layer is ensured. In contrast, the evaporation of the conductive layer 5 can be performed on the room-temperature (unheated) substrate 2 and frame 3. As a result, the conductive layer 5 can be effectively given nanoparticle properties. In addition, conductive layer evaporation is generally performed under the condition of a degree of vacuum of approximately $10^{-4}$ Pa. In contrast, the evaporation of the conductive layer 5 can be performed in a higher pressure state (lower vacuum state) than in the general case. Specifically, the evaporation of the conductive layer 5 can be performed under the condition that the degree of vacuum is preferably $10^{-4}$ Pa or more and, particularly preferably, the degree of vacuum is approximately $10^{-3}$ Pa to $10^{-2}$ Pa. As a result, the conductive layer 5 can be effectively given nanoparticle properties. In the present embodiment, the evaporation of the conductive layer 5 is performed on the room-temperature (unheated) substrate 2 and frame 3 under the condition of a degree of vacuum of approximately $10^{-3}$ Pa to $10^{-2}$ Pa. By the evaporation of the conductive layer 5 being performed under such suitable degree-of-vacuum and temperature conditions, the conductive layer 5 can be more effectively given nanoparticle properties.

Chromium (Cr), nickel (Ni), titanium (Ti), and so on may be used as the material of the conductive layer 5. In addition, a semiconductor such as silicon (Si) may be used as the material of the conductive layer 5. It should be noted that the conductive layer 5 is not illustrated in FIG. 1.

The thickness of the conductive layer 5 may be acquired by film thickness measurement using X-ray fluorescence (XRF). In addition, the thickness of the conductive layer 5 may be acquired by cross-sectional observation and film thickness calculation using a SEM. In this case, a cross section of the conductive layer 5 can be formed by, for example, a focused ion beam (FIB), a cross section polisher (CP), or a fracture. In addition, the thickness of the conductive layer 5 may be acquired by transmission image observation and film thickness calculation using a transmission electron microscope (TEM). In addition, the thickness of the conductive layer 5 may be acquired by film thickness calculation using a confocal laser microscope. In addition, the thickness of the conductive layer 5 may be acquired by height measurement and film thickness calculation using an atomic force microscope (AFM). In addition, the thickness of the conductive layer 5 may be acquired by depth profile measurement using X-ray photoelectron spectroscopy (XPS), Auger electron spectroscopy (AES), or secondary ion mass spectrometry (SIMS).

Next, each hole 2*c* and the conductive layer 5 will be described in detail. As illustrated in (a) in FIG. 4, each hole 2*c* of the substrate 2 includes a tubular portion 21*c* and tapered portions 22*c*. The tubular portion 21*c* extends along the thickness direction of the substrate 2. The tapered portions 22*c* are formed at both axial ends of the tubular portion 21*c*. The tapered portions 22*c* formed at both ends of the tubular portion 21*c* have the same configuration, and thus only the tapered portion 22*c* formed at one end of the tubular portion 21*c* will be described and the tapered portion 22*c* formed at the other end of the tubular portion 21*c* will not be described. The tapered portion 22*c* connects one end of the tubular portion 21*c* and the first surface 2*a*. The tapered portion 22*c* has, for example, a truncated cone shape. The tapered portion 22*c* widens toward the first surface 2*a*. In other words, the width of the tapered portion 22*c* increases toward the first surface 2*a*.

Figure 4:
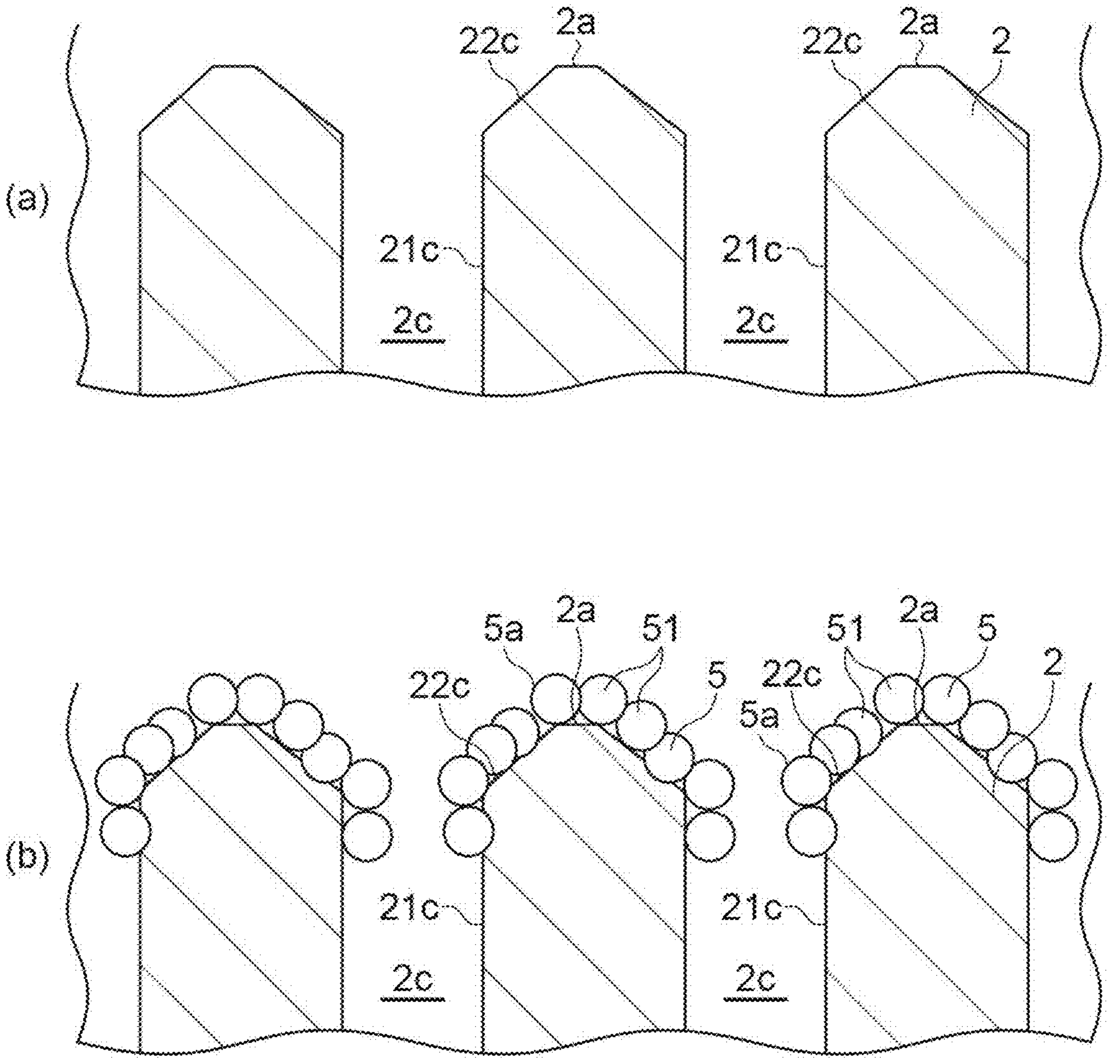
FIG. 4 is a schematic diagram of through holes in the substrate illustrated in FIG. 2 and a schematic diagram of nanoparticles of a conductive layer.

As illustrated in (b) in FIG. 4, the conductive layer 5 is configured by a plurality of nanoparticles 51. A nanoparticle means a particle with a particle size smaller than a predetermined value. In the present embodiment, the nanoparticles 51 have an average particle size of 100 nm or less. The plurality of nanoparticles 51 are deposited on the first surface 2*a* and a part of the inner wall surface of each hole 2*c* on the first surface 2*a* side. Specifically, the plurality of nanoparticles are deposited so as to be continuous on the first surface 2*a*, the tapered portion 22*c*, and a part of the tubular portion 21*c* on the tapered portion 22*c* side. It should be noted that although FIG. 4 schematically illustrates a state where the nanoparticles 51 are formed in a single stage on the first surface 2*a*, the tapered portion 22*c*, and a part of the tubular portion 21*c* on the tapered portion 22*c* side, actually, the plurality of nanoparticles 51 can be stacked in multiple stages.

The average particle size of the nanoparticles 51 is a value acquired using a SEM. Specifically, first, a SEM image of the conductive layer 5 is acquired. Subsequently, by performing, for example, binarization processing on the acquired image of the conductive layer 5, a plurality of pixel groups corresponding to the plurality of nanoparticles 51 of the conductive layer 5 are extracted and, based on the size per pixel, the diameter of a circle having the average area of the plurality of nanoparticles 51 is acquired as the average particle size of the plurality of nanoparticles 51.

A surface 5*a* of the conductive layer 5 is configured by the surfaces of the plurality of nanoparticles 51. Specifically, the surface 5*a* includes a plurality of fine irregularities formed by depositing the plurality of nanoparticles 51. Fine grooves formed between the nanoparticles 51 are formed on the surface 5*a*. The surface area of the surface 5*a* is larger than in a case where the surface 5*a* is flat. The surface 5*a* has nanoparticle properties.

Figure 5:
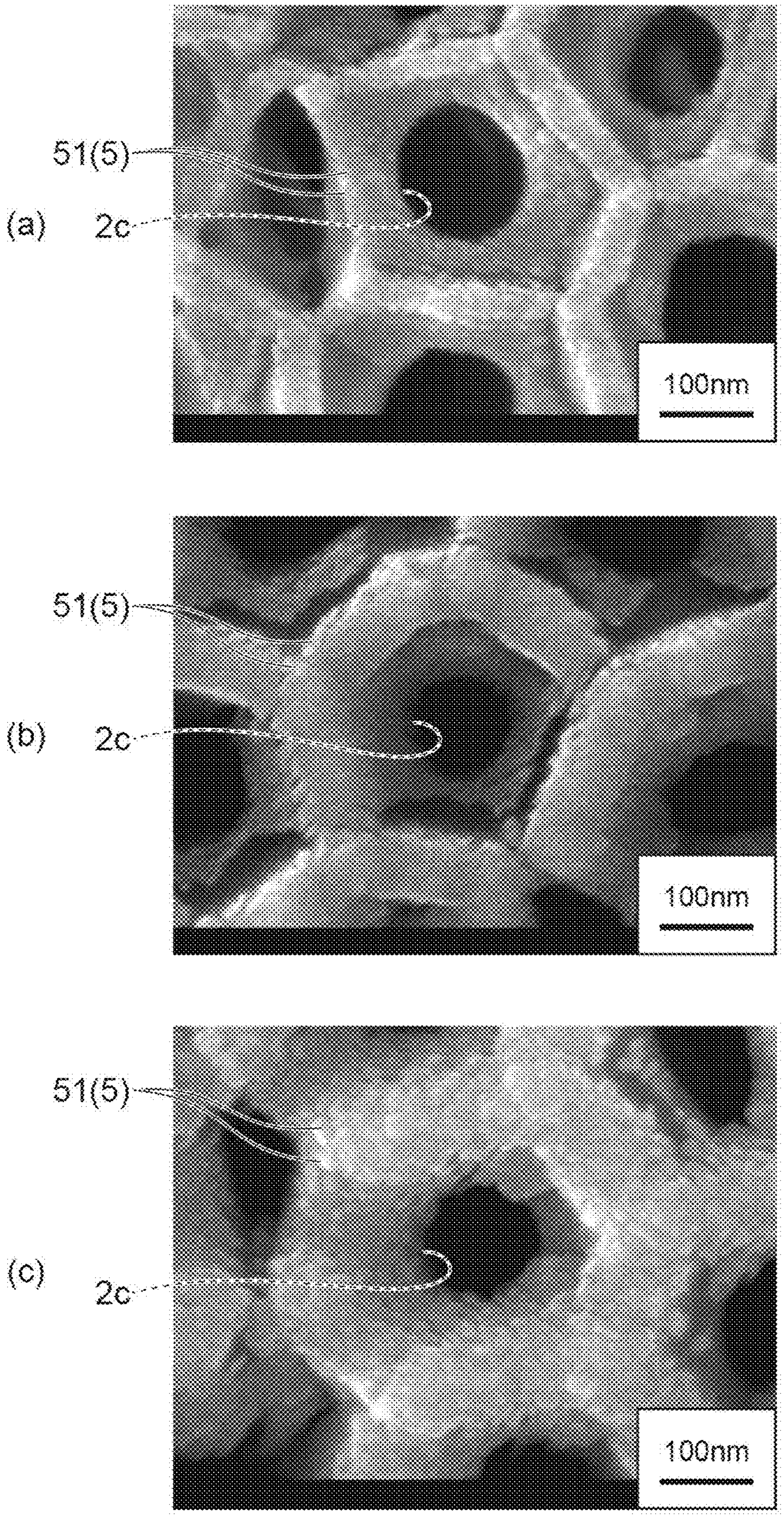
FIG. 5 is a diagram illustrating a magnified image of the conductive layer viewed in the thickness direction of the sample support illustrated in FIG. 2.

FIG. 5 is a diagram illustrating a magnified image of the conductive layer 5 formed by evaporation. The thickness of the conductive layer 5 illustrated in (a) in FIG. 5 is approximately 50 nm. The thickness of the conductive layer 5 illustrated in (b) in FIG. 5 is approximately 100 nm. The thickness of the conductive layer 5 illustrated in (c) in FIG. 5 is approximately 150 nm. As illustrated in (a) to (c) in FIG. 5, the conductive layer 5 is configured by the plurality of nanoparticles 51, and the deposition amount of the nanoparticles 51 increases and each of the nanoparticles 51 becomes conspicuous as the thickness of the conductive layer 5 increases. In addition, the nanoparticles 51 tend to increase in particle size as the thickness of the conductive layer 5 increases. It should be noted that although a pentagonal or hexagonal streaky structure is visually recognized in each of the magnified images of (a) to (c) in FIG. 5, this is because the first surface 2*a* of the substrate 2 has the streaky protrusions.

Figure 6:
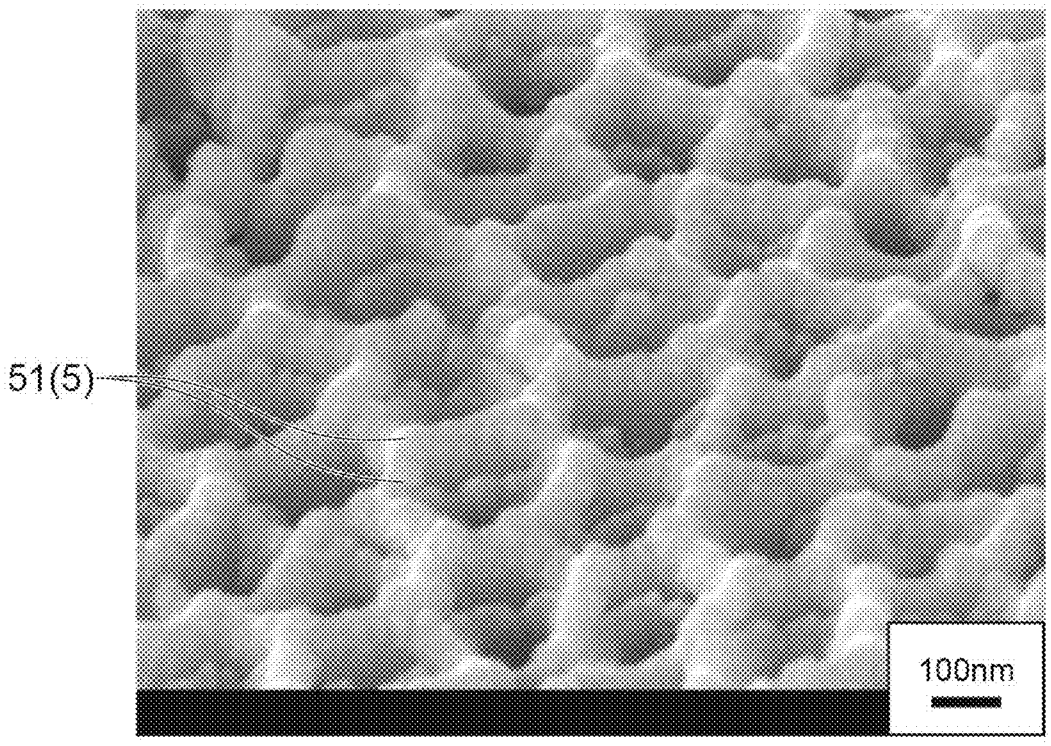
FIG. 6 is a diagram illustrating a magnified image of the conductive layer viewed in a direction intersecting the thickness direction of the sample support illustrated in FIG. 2.
Figure 7:
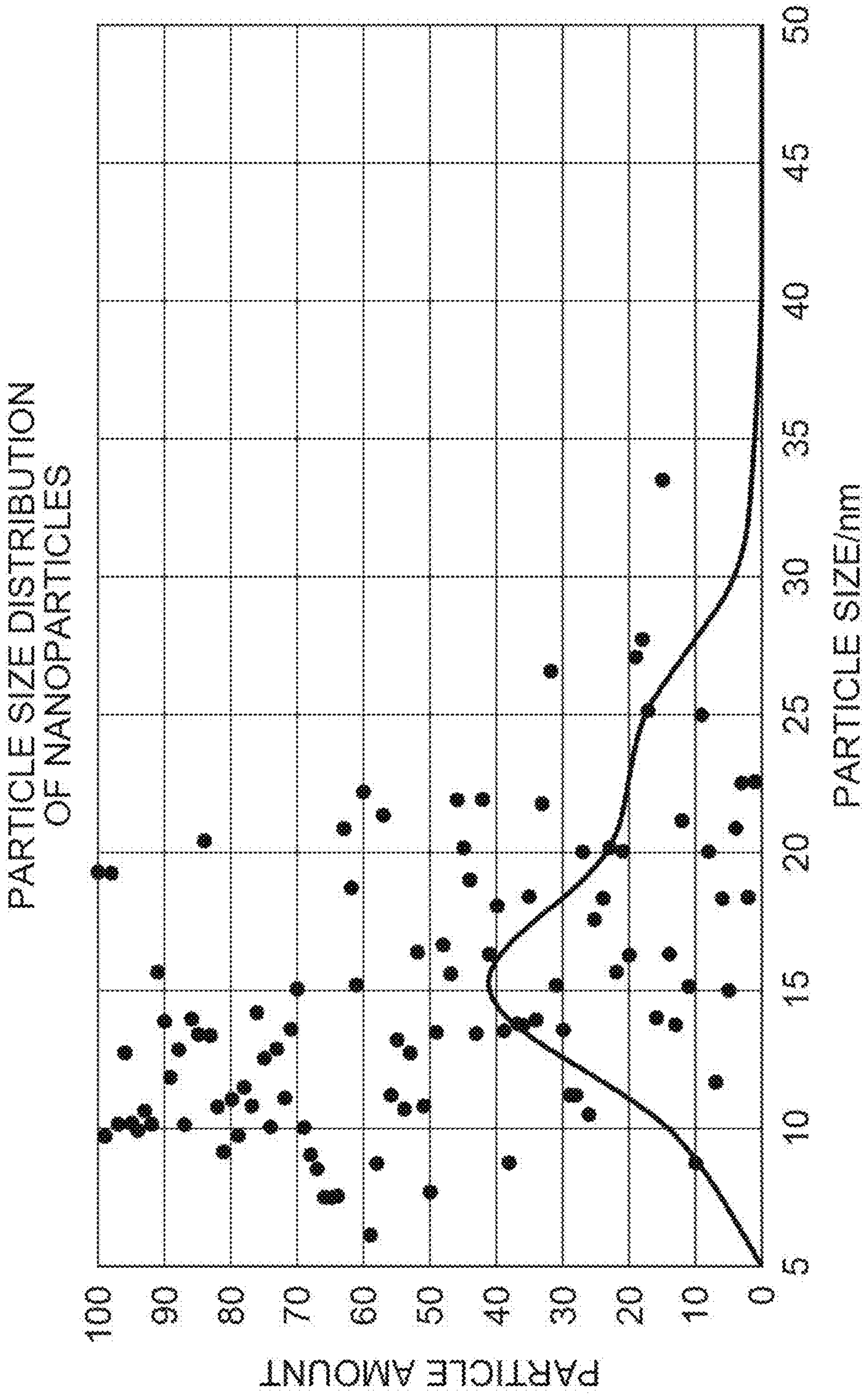
FIG. 7 is a diagram illustrating the particle size distribution of the nanoparticles configuring the conductive layer of the sample support illustrated in FIG. 2.

FIG. 6 is a diagram illustrating a magnified image of the conductive layer 5 illustrated in (b) in FIG. 5, which is viewed in a direction intersecting the thickness direction of the sample support 1. As illustrated in FIG. 6, the plurality of nanoparticles 51 of the conductive layer 5 are deposited on the first surface 2*a* so as to cover a part of the partition wall portions between the holes 2*c* of the substrate 2 on the first surface 2*a* side. The surface 5*a* of the conductive layer 5 is configured by a plurality of irregularities extending along the first surface 2*a*. FIG. 7 is a diagram illustrating an example of the particle size distribution of the nanoparticles 51 of the conductive layer 5 illustrated in (b) in FIG. 5. In the example of FIG. 7, the particle sizes of the nanoparticles 51 are distributed in the range of several nm to 35 nm. It should be noted that the particle sizes of the nanoparticles 51 illustrated in FIG. 7 are values measured by visual SEM image observation.

[Ionization Method and Mass Spectrometry Method]

Figure 8:
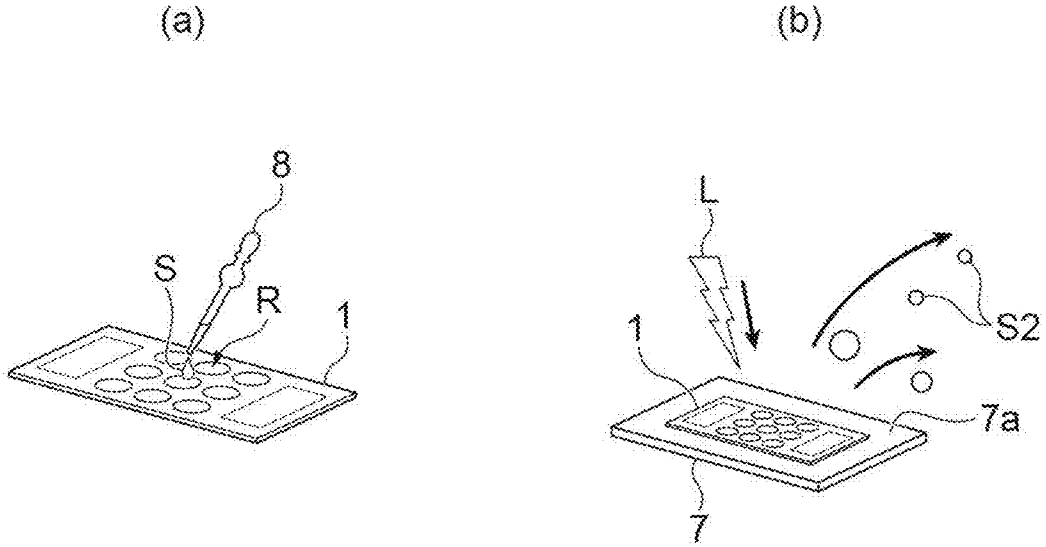
FIG. 8 is a diagram illustrating the procedure of a mass spectrometry method using the sample support illustrated in FIG. 1.

Next, an ionization method and a mass spectrometry method using the sample support 1 will be described. First, the sample support 1 is prepared as illustrated in (a) in FIG. 8. The sample support 1 may be prepared by being manufactured by an ionization and mass spectrometry method performer or may be prepared by being transferred from, for example, a manufacturer or seller of the sample support 1. It should be noted that although the measurement region R count of the sample support 1 illustrated in FIG. 8 is different from that of the sample support 1 illustrated in FIG. 1, the sample support 1 illustrated in FIG. 8 has a structure similar to the structure described with reference to FIGS. 1 to 7.

Subsequently, components of a sample S are introduced into the plurality of holes 2*c* of the sample support 1 (see FIG. 2). Specifically, the sample S is disposed in each measurement region R of the sample support 1. In the present embodiment, a solution containing the sample S is dripped onto each measurement region R with, for example, a pipette 8. As a result, the components of the sample S move from the first surface 2*a* side of the substrate 2 to the second surface 2*b* side via the plurality of holes 2*c*. The components of the sample S remain on the first surface 2*a* side due to, for example, surface tension. Subsequently, with the components of the sample S introduced, the sample support 1 is disposed on a placement surface 7*a* of a slide glass 7 as illustrated in (b) in FIG. 8. The slide glass 7 is a glass substrate on which a transparent conductive film such as an indium tin oxide (ITO) film is formed, and the placement surface 7*a* is the surface of the transparent conductive film. It should be noted that instead of the slide glass 7, a member capable of ensuring conductivity (for example, substrate made of, for example, a metal material such as stainless steel) may be used as the placement portion.

Subsequently, the sample support 1 is fixed to the slide glass 7 using a conductive tape (for example, carbon tape). Subsequently, the components of the sample S are ionized. Specifically, the slide glass 7 on which the sample support 1 is disposed is disposed on the support portion (for example, stage) of a mass spectrometer. Subsequently, the voltage application unit of the mass spectrometer is operated to apply a voltage to the conductive layer 5 of the sample support 1 via the placement surface 7*a* of the slide glass 7 and the tape and, at the same time, the laser beam irradiation unit of the mass spectrometer is operated to irradiate the region of the first surface 2*a* of the substrate 2 corresponding to the measurement region R with laser light (energy ray) L.

When the first surface 2*a* of the substrate 2 is irradiated with the laser light L while the voltage is applied to the conductive layer 5 as described above, energy is transmitted to the components of the sample S remaining on the first surface 2*a* side and the components of the sample S are ionized. As a result, sample ions S2 (ionized components) are generated. Specifically, when the energy is transmitted to the components of the sample S remaining on the first surface 2*a* side, the components of the sample S are vaporized and the sample ions S2 are generated. The above process corresponds to the ionization method using the sample support 1 (laser desorption ionization method in the present embodiment).

Subsequently, the emitted sample ions S2 are detected by the ion detection unit of the mass spectrometer. Specifically, the potential difference generated between the voltage-applied conductive layer 5 and a ground electrode causes the emitted sample ions S2 to move while accelerating toward the ground electrode provided between the sample support 1 and the ion detection unit, and the sample ions S2 are detected by the ion detection unit. In the present embodiment, the potential of the conductive layer 5 is higher than the potential of the ground electrode and moves positive ions to the ion detection unit. In other words, the sample ions S2 are detected in a positive ion mode. Then, the mass spectrum of the molecules configuring the sample S is acquired by the ion detection unit detecting the sample ions S2. The mass spectrometer is, for example, a scanning mass spectrometer using time-of-flight mass spectrometry (TOF-MS). The above process corresponds to the mass spectrometry method using the sample support 1.

As described above, the sample support 1 includes the substrate having the first surface 2*a* and the plurality of holes 2*c* opening to the first surface 2*a*. As a result, when the components of the sample S are introduced into the plurality of holes 2*c*, the components remain on the first surface 2*a* side. Further, when the first surface 2*a* of the substrate is irradiated with an energy ray such as the laser light L while a voltage is applied to the conductive layer 5, the energy is transmitted to the components on the first surface 2*a* side. The sample ions S2 are generated by this energy ionizing the components. Here, the conductive layer 5 is configured by the plurality of nanoparticles 51 and has a thickness of 30 nm or more. As a result, by providing the surface 5*a* of the conductive layer 5 with nanoparticle properties, the surface 5*a* of the conductive layer 5 can be made suitable for ionizing the components of the sample S. Accordingly, with the sample support 1, the signal intensity of the sample ions S2 can be improved and high-sensitivity mass spectrometry can be performed. With the sample support 1, high-sensitivity mass spectrometry can be performed on macromolecular or low-concentration samples difficult to detect by, for example, existing surface-assisted laser desorption/ionization (SALDI).

Sensitivity (signal intensity) improvement is desired in mass spectrometry. The present inventors have found that the signal intensity is affected by the surface state of the conductive layer 5. In other words, the present inventors have found that the signal intensity is improved when the surface 5*a* of the conductive layer 5 has nanoparticle properties. Further, the present inventors have found that the surface state of the conductive layer 5 has a correlation with the thickness of the conductive layer 5. In other words, the present inventors have found that the surface 5*a* of the conductive layer 5 has nanoparticle properties when the thickness of the conductive layer 5 exceeds a predetermined value. In this manner, the present inventors have invented the sample support 1 by focusing on the surface state of the conductive layer 5 and the thickness of the conductive layer 5 from the viewpoint of signal intensity improvement in mass spectrometry.

Figure 9:
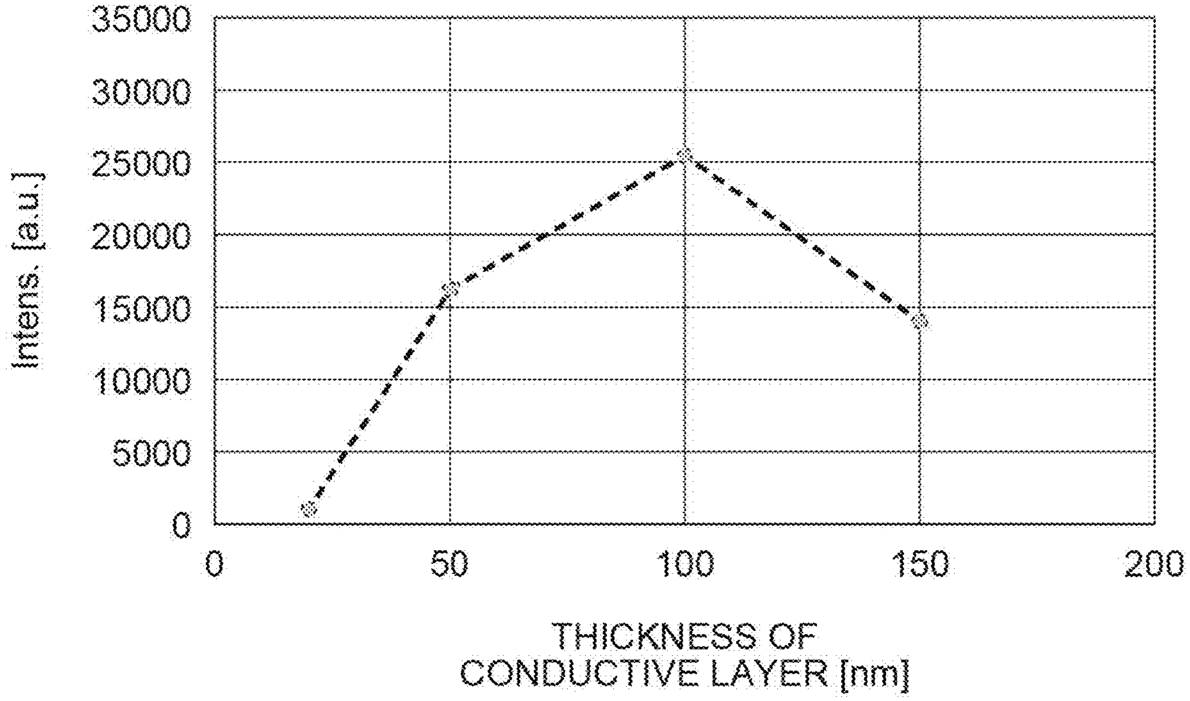
FIG. 9 is a diagram illustrating the effect of the thickness of the conductive layer on signal intensity in the mass spectrometry method using the sample support.

FIG. 9 is a diagram illustrating the effect of the thickness of the conductive layer on the signal intensity in the mass spectrometry method using the sample support. In the example of FIG. 9, an Angiotensin II signal approximately 1046 in m/z was detected a plurality of times using a plurality of sample supports approximately 20 nm, 50 nm, 100 nm, and 150 nm in conductive layer thickness. As illustrated in FIG. 9, at a conductive layer thickness of 50 nm or more, the signal intensity was improved as compared with a conductive layer thickness of 20 nm. In particular, the signal intensity obtained at a conductive layer thickness of 100 nm was 30 times or more the signal intensity obtained at a conductive layer thickness of 20 nm. In this manner, it was confirmed that the surface 5*a* of the conductive layer 5 has nanoparticle properties and the signal intensity is also improved as a result when the thickness of the conductive layer 5 is increased. It is presumed that this is because the surface area of the surface 5*a* increases when the surface 5*a* of the conductive layer 5 has nanoparticle properties, the energy of the energy ray such as the laser light L is easily transmitted to the components of the sample S remaining on the first surface 2*a* side via the surface 5*a* as a result, the absorption of the energy of the laser light L is improved as a result, and the components of the sample S are rapidly heated as a result. In addition, it is presumed that this is because the surface plasmon effect or the like of the conductive layer 5 is improved when the surface 5*a* of the conductive layer 5 has nanoparticle properties.

The nanoparticles 51 are deposited on the first surface 2*a* and a part of the inner wall surface of the hole 2*c* on the first surface 2*a* side. As a result, the components of the sample S introduced into the plurality of holes 2*c* easily come into contact with the nanoparticles 51, and thus the components of the sample S are ionized more easily.

The average particle size of the nanoparticles 51 is 100 nm or less. As a result, the nanoparticle properties of the conductive layer 5 can be appropriately ensured.

The conductive layer 5 has a thickness of 300 nm or less. If the thickness of the conductive layer 5 is relatively large, it may be difficult to ensure the nanoparticle properties of the conductive layer 5. By the thickness of the conductive layer 5 being 300 nm or less, the nanoparticle properties of the conductive layer 5 can be ensured more appropriately.

The width of each of the plurality of holes 2*c* is 50 nm to 400 nm. As a result, the components of the sample S introduced into the plurality of holes 2*c* can be appropriately retained on the first surface 2*a* side of the substrate 2.

The plurality of holes 2*c* regularly extend along the thickness direction of the substrate 2. As a result, the components of the sample S introduced into the plurality of holes 2*c* can be retained on the first surface 2*a* of the substrate 2 for each hole 2*c*. Accordingly, the components of the sample S can be appropriately ionized.

Each of the plurality of holes 2*c* penetrates the substrate 2 from the first surface 2*a* of the substrate 2 to the second surface 2*b* on the side opposite to the first surface 2*a*. As a result, by disposing the sample support 1 on the sample S such that the second surface 2*b* of the sample support 1 faces the sample S, the components of the sample S can be moved from the second surface 2*b* side of the substrate 2 toward the first surface 2*a* side via the plurality of holes 2*c* using capillary action. As a result, imaging mass spectrometry for imaging the two-dimensional distribution of the molecules configuring the sample S can be performed.

The ratio of the thickness of the conductive layer 5 to the pitch between the holes 2*c* (that is, "thickness of the conductive layer 5/pitch between the holes 2*c*") is 0.5 to 1. As a result, the nanoparticle properties of the conductive layer 5 can be appropriately ensured by setting the thickness of the conductive layer 5 based on the pitch between the holes 2*c*.

The material of the conductive layer 5 is platinum or gold. As a result, the conductive layer 5 suitable for ensuring nanoparticle properties can be easily obtained.

The conductive layer 5 is an evaporation film. As a result, the nanoparticle properties of the conductive layer 5 can be appropriately ensured.

The hole 2*c* includes the tapered portion 22*c*. As a result, the nanoparticles 51 are easily deposited on a part of the inner wall surface of the hole 2c on the first surface 2a side, and thus the nanoparticle properties of the conductive layer 5 can be easily ensured.

[Modification Example] Although an embodiment of the present disclosure has been described above, the present disclosure is not limited to the embodiment. For example, the material and shape of each configuration are not limited to the material and shape described above, and various materials and shapes can be adopted.

Figure 10:
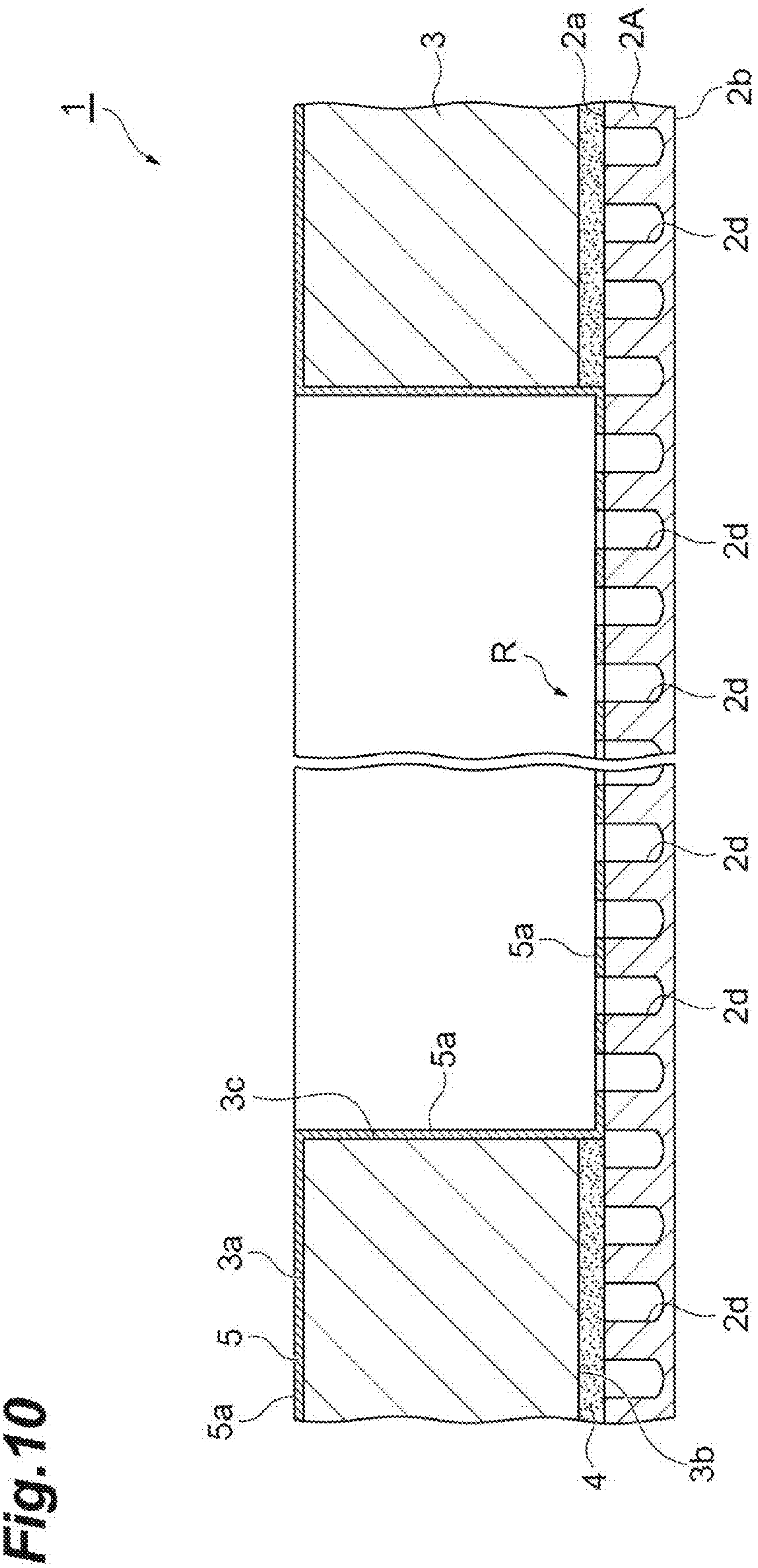
FIG. 10 is a cross-sectional view of a sample support according to a modification example.

In addition, although each of the plurality of holes 2c penetrates the substrate 2 in the above embodiment, the plurality of holes may not penetrate the substrate. Specifically, the sample support 1 may be provided with a substrate 2A illustrated in FIG. 10 instead of the substrate 2. As illustrated in FIG. 10, the substrate 2A differs from the substrate 2 in that the substrate 2A has a plurality of holes 2d instead of the plurality of holes 2c. Each of the plurality of holes 2d does not penetrate the substrate 2A. In other words, each of the plurality of holes 2d is open to the first surface 2a and is not open to the second surface 2b. The substrate 2A may be, for example, an anodized alumina porous film used for SALDI.

In addition, although an example in which the plurality of holes 2c are uniformly formed in the substrate 2 has been illustrated in the above embodiment, the substrate 2 may be, for example, a substrate having an irregular porous structure (such as a sintered body of glass beads).

In addition, although an example in which the hole 2c includes the tubular portion 21c and the tapered portion 22c has been illustrated, the hole 2c may not include the tapered portion 22c. In this case, both ends of the tubular portion 21c are connected to the first surface 2a and the second surface 2b, respectively.

In addition, although the plurality of measurement regions R are defined by the plurality of openings 3c provided in the frame 3 in the above embodiment, the sample support may be provided with only one measurement region R. In addition, although the mass spectrum of the components of the sample S is acquired in the above embodiment, imaging mass spectrometry for imaging the two-dimensional distribution of the molecules configuring the sample S may be performed.

In addition, the conductive layer 5 may or may not be provided on the second surface 2b of the substrate 2 and the inner wall surface of each hole 2c insofar as the conductive layer 5 is provided at least on the first surface 2a of the substrate 2.

In addition, the application of the sample support 1 is not limited to the ionization of the sample S by irradiation with the laser light L. The sample support 1 can be used for ionizing the sample S by irradiation with an energy ray such as laser light, an ion beam, and an electron beam.

REFERENCE SIGNS LIST

1: sample support, 2, 2A: substrate, 2a: first surface, 2b: second surface, 2c, 2d: hole, 5: conductive layer, 51: nanoparticle, S: sample.

The invention claimed is:

1. A sample support used for sample component ionization, the sample support comprising:

a substrate having a first surface and a plurality of holes opening to the first surface; and a conductive layer provided on the first surface so as not to block the hole, wherein the conductive layer is configured by a plurality of nanoparticles connected to each other to form the conductive layer and has a thickness of 30 nm or more, and wherein the conductive layer has nanosized irregularities on its outermost surface.

2. The sample support according to claim 1, wherein the nanoparticles are deposited on the first surface and a part of an inner wall surface of the hole on a first surface side.

3. The sample support according to claim 1, wherein an average particle size of the nanoparticles is 100 nm or less.

4. The sample support according to claim 1, wherein the conductive layer has a thickness of 300 nm or less.

5. The sample support according to claim 1, wherein a width of each of the plurality of holes is 50 nm to 400 nm.

6. The sample support according to claim 1, wherein the plurality of holes regularly extend along a thickness direction of the substrate.

7. The sample support according to claim 6, wherein a ratio of the thickness of the conductive layer to a pitch between the holes is 0.5 to 1.

8. The sample support according to claim 1, wherein the substrate has a second surface on a side opposite to the first surface, and each of the plurality of holes penetrates the substrate from the first surface to the second surface.

9. The sample support according to claim 1, wherein a material of the conductive layer is platinum or gold.

10. A sample support used for sample component ionization, the sample support comprising:

a substrate having a first surface and a plurality of holes opening to the first surface; and a conductive layer provided on the first surface so as not to block the hole, wherein the conductive layer is configured by a plurality of nanoparticles and has a thickness of 30 nm or more, the substrate has a second surface on a side opposite to the first surface, each of the plurality of holes penetrates the substrate from the first surface to the second surface, and the conductive layer has nanosized irregularities on its outermost surface.

* * * * *